United States Patent
Baehrle-Miller et al.

(10) Patent No.: US 10,493,960 B2
(45) Date of Patent: Dec. 3, 2019

(54) METHOD FOR OPERATING AT LEAST ONE PARKING BRAKE OF A MOTOR VEHICLE

(71) Applicant: Robert Bosch GmbH, Stuttgart (DE)

(72) Inventors: Frank Baehrle-Miller, Schoenaich (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/824,600

(22) Filed: Nov. 28, 2017

(65) Prior Publication Data

US 2018/0148020 A1 May 31, 2018

(30) Foreign Application Priority Data

Nov. 30, 2016 (DE) .................. 10 2016 223 860

(51) Int. Cl.
| | |
|---|---|
| *B60T 8/32* | (2006.01) |
| *B60T 7/04* | (2006.01) |
| *B60T 13/74* | (2006.01) |
| *B60T 7/12* | (2006.01) |
| *B60T 8/00* | (2006.01) |
| *B60T 8/17* | (2006.01) |

(52) U.S. Cl.
CPC .............. *B60T 7/045* (2013.01); *B60T 7/122* (2013.01); *B60T 8/00* (2013.01); *B60T 8/17* (2013.01); *B60T 13/74* (2013.01); *B60T 2201/06* (2013.01); *B60T 2220/04* (2013.01)

(58) Field of Classification Search
CPC ........... B60T 7/045; B60T 13/66; B60T 13/74
USPC ..................................... 303/191; 701/70, 72
See application file for complete search history.

(56) References Cited

U.S. PATENT DOCUMENTS

| | | | | |
|---|---|---|---|---|
| 3,119,477 A | * | 1/1964 | Ryder .................... | B60T 7/122 180/271 |
| 4,629,043 A | * | 12/1986 | Matsuo .................. | B60T 7/107 188/2 D |
| 4,821,854 A | * | 4/1989 | Koshizawa ........... | B60W 10/02 477/74 |
| 6,719,076 B1 | * | 4/2004 | Tabata ................... | B60K 31/00 180/65.7 |
| 6,997,289 B2 | * | 2/2006 | Iwagawa ................ | B60T 7/107 188/2 D |
| 7,813,859 B2 | * | 10/2010 | Aizawa .................. | B60T 7/122 180/281 |
| 2002/0023818 A1 | * | 2/2002 | Yanaka .................... | B60T 7/02 192/219.4 |
| 2004/0226768 A1 | * | 11/2004 | DeLuca ................. | B60T 7/042 180/275 |

(Continued)

FOREIGN PATENT DOCUMENTS

DE    10 2005 011 552 A1    12/2005

*Primary Examiner* — Christopher P Schwartz
(74) *Attorney, Agent, or Firm* — Maginot, Moore & Beck LLP

(57) ABSTRACT

A method for operating a hill hold controller of a motor vehicle including at least one parking brake. The parking brake is disengaged according to an actuation of a gas pedal of the motor vehicle. The disengagement of the parking brake is released according to a variable representing a road gradient. The release to disengage the parking brake is granted, independently of the variable and/or the availability of the variable, when the gas pedal of the motor vehicle reaches or exceeds a predefinable release position by way of the actuation thereof.

10 Claims, 1 Drawing Sheet

(56) References Cited

U.S. PATENT DOCUMENTS

2006/0049691 A1* 3/2006 Deprez ................... B60T 7/00
                                                303/191
2012/0161508 A1* 6/2012 Beever ................... B60T 7/12
                                                303/191

* cited by examiner

METHOD FOR OPERATING AT LEAST ONE PARKING BRAKE OF A MOTOR VEHICLE

This application claims priority under 35 U.S.C. § 119 to patent application no. DE 10 2016 223 860.4, filed on Nov. 30, 2016 in Germany, the disclosure of which is incorporated herein by reference in its entirety.

BACKGROUND

Methods, devices, and hill hold controllers of the type mentioned at the outset are known from the prior art. For example, the laid-open application DE 10 2005 011 552 A1 discloses a method for activating a hill hold controller of a vehicle. The hill hold controller disengages the parking brake, when the motor vehicle is at a standstill, according to the actuation of the gas pedal and a present road gradient, and so the parking brake is disengaged in such a way that the motor vehicle is reliably prevented from rolling backward on the slope. In this case, a comparison is carried out, in particular, of a downgrade torque with the sum of the holding brake torque and the applied engine torque. It is necessary to know the gradient angle of the road in order to determine the downgrade torque. For this purpose, the parking brake is disengaged with delay relative to the actuation of the gas pedal. In order to disengage the parking brake, it is provided to detect the speed of movement of the brake pedal in order to thereby detect whether the driver desires to disengage the parking brake. If this is detected, the parking brake is subsequently disengaged, upon an actuation of the gas pedal, in a manner corresponding to the gas pedal actuation, wherein the decreasing parking brake torque is compensated for by the increasing drive torque, and so rollback is reliably prevented.

SUMMARY

A method for operating a hill hold controller of a motor vehicle comprising at least one parking brake, wherein the parking brake is disengaged according to an actuation of a gas pedal of the motor vehicle, and wherein the disengagement of the parking brake is released according to a variable representing a road gradient.

The invention further relates to a device for operating a hill hold controller of a motor vehicle comprising at least one parking brake, wherein the parking brake comprises at least one electromechanical or electrohydraulic brake actuator, a parking brake operating element which can be actuated by a driver, a gradient detection device, and a device for detecting the actuation of a gas pedal of the motor vehicle.

The invention further relates to a hill hold controller of a motor vehicle comprising a parking brake device which includes at least one activatable brake actuator, a parking brake operating element which can be actuated by a driver of the motor vehicle, a gradient detection device, and a device for detecting the actuation of a gas pedal of the motor vehicle.

The method according to the invention having the features of claim 1 has the advantage that a disengagement of the parking brake is ensured, when this is what the driver wants, even in the case of a fault in the system for ascertaining the road gradient. In particular, the method according to the invention ensures that the driver can also disengage the parking brake when both a parking brake operating element and the road gradient detection device are defective.

According to the invention, it is provided, for this purpose, that the release to disengage the parking brake is granted, independently of the variable and/or the availability of the variable, when the gas pedal reaches or exceeds a predefinable release position by way of the actuation thereof. Therefore, by actuating the gas pedal, i.e., by specifying a setpoint drive torque, the driver can disengage the parking brake device or the parking brake, or communicate the desire to disengage the parking brake. In contrast to the previously known prior art, the driver therefore does not need to rely on actuating the brake pedal, but rather can intuitively actuate the gas pedal. The method is therefore easier for the driver to carry out and is intuitively understood by the driver, in particular in the case of a defect in the parking brake operating element and/or the road gradient detection device, and does not need to be learned for the first time. As a result, a reliable operation of the motor vehicle is always ensured.

According to one preferred refinement of the invention, it is provided that the disengagement is first released when the gas pedal is moved, via the actuation thereof, out of its starting position by a pedal travel by more than 70%, in particular by more than 80% of a maximum possible pedal travel. In order to ensure that the disengagement of the parking brake is released or that a release of the parking brake can take place, the driver must initially move the gas pedal out of the starting position up to the release position, which, in the present case, is 70%, in particular 80%, of the maximum possible pedal travel. The driver must therefore move the gas pedal further than the pedal travel that he would normally provide in a driveaway process. An inadvertent disengagement or release of the parking brake is therefore prevented in an easy way.

Particularly preferably, it is provided that the disengagement of the parking brake is released only when the gas pedal is moved, via the actuation thereof, out of the starting position by the maximum possible pedal travel. The gas pedal is therefore to be moved into the so-called kickdown position, so that the disengagement of the parking brake is released. As a result, the security against the inadvertent disengagement of the parking brake is further increased. In particular, the release position is thereby clearly noticeable by the driver.

According to one preferred refinement of the invention, it is provided that, after the disengagement has been released, the parking brake is first disengaged when the gas pedal is moved, from the release position, back to a predefinable disengagement position or is moved out of the starting position again by a predefinable minimum pedal travel. The sole purpose of the initial movement of the gas pedal into the release position is therefore to release the disengagement of the parking brake, but not to disengage it, however. The parking brake is first disengaged when the disengagement position is subsequently reached or when the gas pedal is actuated again, and so the motor vehicle can be driven. As a result, it is ensured that the vehicle is not driven with the setpoint drive torque, which is set or predefined, when the gas pedal is in the release position. This could otherwise result in a surprisingly strong drive torque. Given that the gas pedal must be initially moved back to the release position or must be actuated again in order to actually disengage the parking brake, this is reliably prevented.

In addition, it is preferably provided that the release position or the minimum pedal travel is predefined as a function of an assumed road gradient. Since the detection of the road gradient cannot be carried out, the disengagement of the parking brake is determined as a function of a predefined or predefinable or assumed gradient. The system therefore assumes a fixedly predefined gradient which is selected in such a way that a safe driveaway is guaranteed in the case of the assumed gradient. In particular, it is assumed in this case that there is a road gradient of the type that can occur at a maximum on usual roads, in order to also prevent a certain rollback of the vehicle in this case. The disadvantage in this case is that the drive torque therefor can already be relatively high, which can result in a high acceleration after disengagement of the parking brake of the motor vehicle.

Preferably, a disengagement position or a minimum pedal travel is therefore determined on the basis of a 4% to 6% gradient, in particular on the basis of a 5% gradient. As a result, approximately 85% of all driveaway processes by motor vehicles are covered. It is ensured, in this case, that the parking brake is not first disengaged, for example, when the gas pedal has reached 80% of the maximum pedal travel, which would result in a correspondingly high drive torque. Simultaneously, it is ensured that the holding force of the parking brake is maintained, in 85% of all driving situations, for so long that a rollback of the vehicle on the road gradient is prevented, provided the vehicle is located on a road gradient.

According to one preferred refinement of the invention, it is provided that, in order to release the disengagement, a parking brake operating element of the parking brake is monitored for a disengagement actuation, and the method is carried out only when the determination of the variable cannot be carried out and an actuation of the parking brake operating element cannot be established. As mentioned at the outset, the combination of two fault cases is taken into consideration here. If both the road gradient detection device as well as the parking brake operating element do not function or do not function properly, it is ensured via the advantageous method that the parking brake will be nevertheless disengaged. However, if the parking brake operating element and/or the road gradient detection device function properly, the driver can also continue to disengage the parking brake in a conventional manner with which he is familiar. The method is therefore first activated in the case of a fault of the two aforementioned elements, and so an inadvertent disengagement of the parking brake by means of an ill-considered gas-pedal actuation is prevented when the parking brake operating element or the road gradient detection device function properly. The parking brake operating element is understood to be the totality, i.e., also including the information-based connection of the parking brake element to a control unit carrying out the method, and so the advantageous method is utilized when there is a transmission error, for example, in the communication between the parking brake operating element and the control unit or between the road gradient detection device and the control unit.

Furthermore, it is preferably provided that the disengagement is released only when the operating state of a clutch, a drive machine and, optionally, a manual transmission of the motor vehicle and, in particular a presence of a driver can be flawlessly established. In particular, the disengagement is released only when all three units are functional. It is therefore ensured that the parking brake is disengaged only when the motor vehicle is even capable of transmitting the setpoint drive torque to drive wheels of the motor vehicle.

The device according to the invention having the features of claim 9 is distinguished by a specially configured control unit which is designed for carrying out the method according to the invention when used as intended. The aforementioned advantages result in this case.

The parking brake device according to the invention having the features of claim 10 is distinguished by the device according to the invention. The aforementioned advantages also result in this case.

Further advantages and preferred features and combinations of features result, in particular, from that which was described above, and from the claims.

BRIEF DESCRIPTION OF THE DRAWINGS

The invention is to be explained in greater detail in the following with reference to the drawing. Wherein.

DETAILED DESCRIPTION

Figure 1:
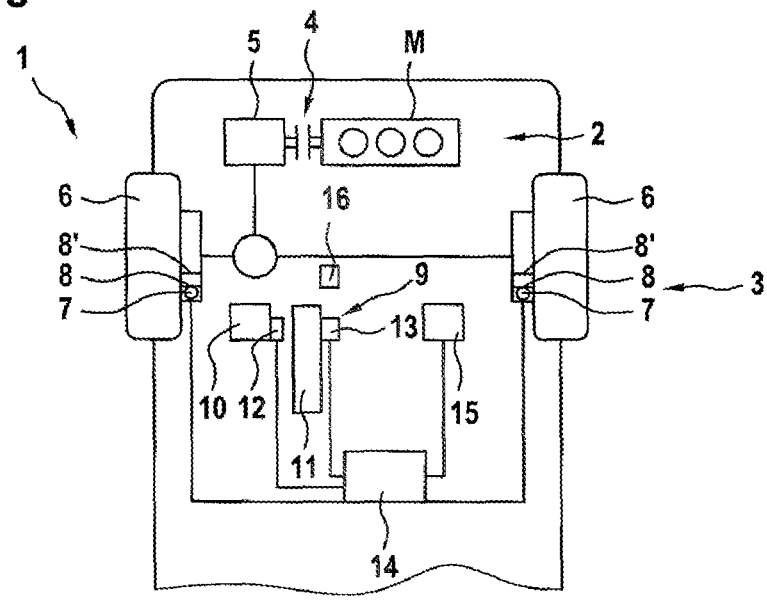
FIG. 1 shows a simplified top view of a motor vehicle.

FIG. 1 shows a simplified top view of a motor vehicle 1 which comprises a brake system 3 in addition to a drive device 2 which is merely indicated here. The drive device 2 includes, in particular, a drive machine M, such as, for example, an internal combustion engine and/or electrical machine, which is operatively connected to drive wheels 6 of the motor vehicle 1, in particular by means of a clutch 4 and/or a transmission 5 comprising multiple selectable gear ratios. Wheel brakes 7 of the brake system 3 are also assigned to the drive wheels 6 or other wheels of the motor vehicle 1. The wheel brakes 7 comprise an integrated parking brake 8 which is designed, in particular, to comprise an electrical motor or to be electromechanical. If the parking brake 8 is activated or acted upon with an electrical voltage, a brake actuator 8', for example, an electric motor, is activated, which moves, in particular, a brake piston of the wheel brake 7, and so a clamping force is generated, by means of which a brake disk, which is connected to the particular drive wheel 6 for conjoint rotation, is clamped between two brake shoes of the particular wheel brake 7.

The motor vehicle 1 also comprises a pedal device 9 which includes a brake pedal 10 and a gas pedal 11. Optionally, the pedal device 9 also includes a clutch pedal. A sensor device 12 and 13 for detecting a pedal actuation are assigned to the brake pedal 10 and the gas pedal 11, respectively. The sensor devices 12, 13 are connected to a control unit 14 in this case, which is connected to the drive device 2 and to the brake system 3 in order to drive these. In addition, the control unit 14 is connected to a road gradient detection device 15 which comprises a rotation rate sensor, for example, in order to detect a variable representing a present road gradient.

Figure 2:
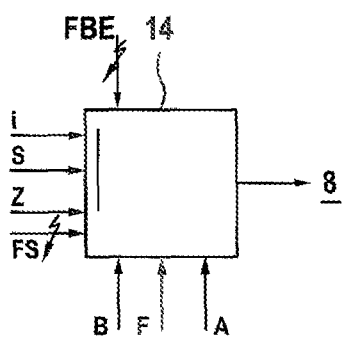
FIG. 2 shows an advantageous method for operating the motor vehicle on the basis of a flow diagram.

FIG. 2 shows a simplified block diagram of a method for operating a hill hold controller of the brake system 3 or the parking brakes 8. For this purpose, FIG. 2 shows, in a simplified manner, the control unit 14, to which signals are supplied, and which, in response to the signals, outputs an activation command to one and/or the other parking brake 8. The signal flows are shown by means of arrows in this case. The control unit 14 receives, from the transmission 5, a piece of information i regarding the currently active gear ratio between the drive machine and the drive wheels 6. In addition, the control unit 14 receives a piece of information regarding the switching state S of the clutch 4. In addition, the control unit 14 receives a state signal Z from the drive machine, i.e., the internal combustion engine in this case, of the drive device.

In addition, the control unit 14 receives the signals B and F from the sensor devices 12 and 13, and a signal A from a device for detecting the presence of a driver. This device can be, for example, a seat belt latch mechanism or a load sensor in the driver's seat. In addition, the control unit 14 processes the signal FS from the road gradient detection device 15. Moreover, a parking brake operating element 16 is situated in the vehicle interior, which can be actuated by the driver in order to disengage or activate the parking brake 8, and sends a corresponding signal FBE to the control unit 14. During normal operation, the control unit 14 monitors the state of actuation of the parking brake operating element 16. If the driver actuates this, the control unit 14 activates the parking brakes 8 in order to adjust or release a braking force. In this case, the control unit 14 continues to monitor the parking brake operating element 16 and the road gradient detection device 15 for their proper performance. If the driver actuates the parking brake operating element in order to release the parking brake, and if a hill hold controller is activated, the parking brake 8 is released by the control unit 14 according to the road gradient or the variable detected by the road gradient detection device 15 and according to the setpoint drive torque predefined by means of the gas pedal 11 in such a way that, when the motor vehicle is situated on a slope, a rollback or an undesirable rolling that is counter to the desired driving direction is prevented upon release of the parking brake 8.

On the basis of the method described in the following, the case is to be explained in which both the gradient detection device 15 and the parking brake operating element 16 function incorrectly, and so an actuation of the parking brake operating element 16 and the present road gradient cannot be ascertained, as shown with the aid of arrows in the associated signal arrows FB and FBE in FIG. 2.

Initially, the control unit 14 checks to determine whether the signals from the transmission 5, the clutch 4, the drive motor, and the presence of a driver are reliably detected and can be evaluated. If it is also detected, in this case, that the signal from the road gradient detection device 15 and the parking brake operating device 16 are faulty or are not detectable/are unavailable, a release position for an emergency release of the parking brake 8 is assigned to the gas pedal 11, as is to be explained in greater detail in the following. In order to ensure that the driver is nevertheless able to release the parking brake 8, a release position is assigned to the gas pedal 11, which the gas pedal 11 must reach, from the starting position, in the above-described situation, in order to release, or enable, a disengagement of the parking brake 8. The actuation of the gas pedal 11 is therefore monitored by means of the sensor device 13. In this case, the sensor device 13 detects, in particular, a movement path of the gas pedal 11. According to a first exemplary embodiment, a movement path of approximately 80% of the maximum pedal travel is assigned to the gas pedal 11 as the release position. If the gas pedal therefore moves by 80% of the maximum possible gas pedal travel, it is detected that the driver would like to disengage the parking brake 8. The release position is selected to be so high that a disengagement demand is not accidentally detected by way of a slight pedal actuation by the driver. The motor vehicle 1 is therefore reliably prevented from beginning to roll in an undesired manner.

Alternatively, the release to disengage the parking brake 8 is first granted when the maximum possible pedal travel, as the release position, is reached. Therefore, the release is first granted when the driver carries out a so-called kickdown or moves the gas pedal 11 into a kickdown position. The kickdown position can also be detected by the sensor device 13, such as by means of a kickdown switch which is installed in the vehicle, and can be actuated when the gas pedal 11 is stepped on. As a result, the security against an inadvertent disengagement of the parking brake 8 is further increased.

Advantageously, the disengagement of the parking brakes 8 first takes place, however, when the gas pedal 11 has been actuated from the release position back in the direction of the starting position up to a disengagement position or, once more, from the starting position past a minimum pedal travel. This is also monitored by means of the sensor device 13. In particular, the parking brake 8 is first disengaged when the gas pedal 11 has reached a position which would be necessary for an automatic disengagement of the parking brake 8 on a 5% gradient. As a result, approximately 85% of all driveaway processes of a motor vehicle are reliably covered, and so a rollback of the motor vehicle 1 in a direction counter to the desired directions of travel is reliably prevented. Due to the fact that the gas pedal 11 must be moved back to the disengagement position or actuated once more in order to disengage the parking brake 8, it is ensured that the motor vehicle 1 does not disengage the parking brake 8 already when the gas pedal 11 is not yet in the kickdown position or in the disengagement position in which a correspondingly high setpoint drive torque is predefined. As an alternative to the represented exemplary embodiment, it is also conceivable to carry out the method when the road gradient detection device 15 is defective or does not deliver a signal or only delivers a faulty signal to the control unit 14.

What is claimed is:

1. A method for operating a hill hold controller of a motor vehicle including at least one parking brake, the method comprising:
   in a normal operating mode:
      enabling disengagement of the at least one parking brake according to a variable representing a road gradient; and
      after the disengagement is enabled, disengaging the at least one parking brake according to an actuation of a gas pedal of the motor vehicle; and
   in a fault operating mode:
      enabling the disengagement of the at least one parking brake, independently of the variable and/or an availability of the variable, when a first actuation of the gas pedal of the motor vehicle reaches or exceeds a predefinable release position; and
      after the disengagement is enabled, disengaging the at least one parking brake in response to a second actuation of the gas pedal.

2. The method according to claim 1, wherein the predefinable release position is reached or exceeded by moving the gas pedal, via the first actuation, out of a starting position by a pedal travel by more than 70% of a maximum possible pedal travel.

3. The method according to claim 1, wherein the predefinable release position is reached or exceeded by moving the gas pedal, via the first actuation, out of a starting position by a maximum possible pedal travel.

4. The method according to claim 1, wherein, after enabling the disengagement of the at least one parking brake in the fault operating mode, the at least one parking brake is disengaged when the gas pedal is moved by the second actuation (i) from the predefinable release position back to a predefinable disengagement position or (ii) back to a starting position and then out of the starting position again by a predefinable minimum pedal travel.

5. The method according to claim 4, further comprising:
setting the predefinable release position or the predefinable minimum pedal travel based on a predefinable/predefined road gradient.

6. The method according to claim 4, further comprising;
determining the predefinable release position or the predefinable minimum pedal travel based on a 4% to 6% road gradient.

7. The method according to claim 1, wherein:
in the normal operating mode, monitoring a parking brake operating element of the at least one parking brake for a disengagement actuation in order to disengage the at least one parking brake; and
activating the fault operating mode only when the determination of the variable cannot be carried out and an actuation of the parking brake operating element cannot be established.

8. The method according to claim 1, further comprising:
enabling the disengagement in the fault mode only when an operating state of a clutch, a drive machine, and a transmission of the motor vehicle are established as functional.

9. The method according to claim 1, wherein a control unit is configured, when operated properly, to carry out the method.

10. A parking brake operating device for operating at least one parking brake of a motor vehicle, comprising:
at least one controllable brake actuator;
a parking brake operating element configured to be actuated by a driver of the motor vehicle;
a gradient detection device configured to detect a variable representing a road gradient;
a device configured to detect an actuation of a gas pedal of the motor vehicle; and
a hill hold controller configured to:
in a normal operating mode:
enable disengagement of the at least one parking brake according to the variable representing the road gradient, and
after the disengagement is enabled, disengaging the at least one parking brake according to an actuation of a gas pedal of the motor vehicle; and
in a fault operating mode:
enable the disengagement of the at least one parking brake, independently of the variable and/or an availability of the variable, when a first actuation of the gas pedal reaches or exceeds a predefinable release position, and
after the disengagement is enabled, disengage the at least one parking brake in response to a second actuation of the gas pedal.

* * * * *